United States Patent [19]

Ikeuchi et al.

[11] Patent Number: 4,680,776
[45] Date of Patent: Jul. 14, 1987

[54] PROTECTION SWITCHING SYSTEM FOR CARRIER TRANSMISSION LINE

[75] Inventors: Satoshi Ikeuchi, Kawasaki; Ikuo Taniguchi, Inagi, both of Japan

[73] Assignee: Fujitsu Limited, Kawasaki, Japan

[21] Appl. No.: 669,836

[22] Filed: Nov. 9, 1984

[30] Foreign Application Priority Data

| Nov. 11, 1983 | [JP] | Japan | 58-212030 |
| Nov. 18, 1983 | [JP] | Japan | 58-217402 |
| Jan. 25, 1984 | [JP] | Japan | 59-011256 |

[51] Int. Cl.$^4$ .......................................... H04L 7/02
[52] U.S. Cl. ........................................ 375/40; 370/16; 340/825.01; 371/8
[58] Field of Search ................ 375/38, 40; 371/8; 370/16; 455/8; 340/825.01, 825.03; 178/69 G; 179/175.3 R, 175.3 S

[56] References Cited

U.S. PATENT DOCUMENTS

| 3,111,624 | 11/1963 | Farkas | 340/825.01 |
| 3,681,694 | 8/1972 | Sarati | 455/8 |
| 3,963,988 | 6/1976 | Niethammer | 375/40 |
| 3,983,340 | 9/1976 | Lima | 379/2 |
| 4,071,700 | 1/1978 | Huffman et al. | 370/16 |
| 4,365,247 | 12/1982 | Bargeton et al. | 179/175.3 S |
| 4,442,518 | 4/1984 | Morimoto | 371/8 |

FOREIGN PATENT DOCUMENTS

| 2525438 | 6/1975 | Fed. Rep. of Germany . |
| 2753420 | 7/1979 | Fed. Rep. of Germany . |
| 56-153859(A) | 11/1981 | Japan . |

OTHER PUBLICATIONS

T. Ogawa et al., "405 Mb/s Single-Mode Optical Fiber Transmission System," pp. 779-782, Links For The Future, Science, Systems & Services for Communications, IEEE International Conference on Communications, May 14-17, 1984, RAI Congress Centre, Amsterdam, Dewilde et al., Ed.
European Search Report, Vienna, 12-11-85.
"DC-400M Protection Switching Equipment Using Microprocessor", pp. 1-15, Fujitsu Scientific and Technical Journal, Dec. 1980.

Primary Examiner—Robert L. Griffin
Assistant Examiner—Stephen Chin
Attorney, Agent, or Firm—Staas & Halsey

[57] ABSTRACT

A line protection switching system of improved reliability decreases the time for protection line switching. In order to increase reliability, service signals are sent in parallel via a plurality of transmission lines, using a service bit area of PCM bit frames. The system switches a failed transmission line to a stand by line, at a local station where trouble is detected without waiting for the switching of an opposite station. At the same time, a switching command is sent to the opposite station. If the switching of the opposite station fails, the local station commands a retry of the switching operation. If it again fails, the local station returns the transmission line to the initial state. In addition, a low priority signal is transmitted through the stand by line, so that the total system operates more economically.

21 Claims, 10 Drawing Figures

PROTECTION SWITCHING SYSTEM FOR CARRIER TRANSMISSION LINE

BACKGROUND OF THE INVENTION

The present invention relates to a protection switching system for a carrier transmission line, more particularly it relates to a method to increase the reliability of the protection system and to utilizing a stand by system as a signal transmission line to economize the carrier transmission system.

It is essential to provide a stand by system to increase the reliability of a carrier transmission system, and when some trouble occurs in the working line, the signal is switched to a stand by system to transmit the signals. Such switching is used very commonly for wireless transmission lines, since fading is inevitable in radio transmission, and therefore, frequency diversity and space diversity systems have been developed. But the situation for a wired transmission line system is slightly different, since there is usually no need to be concerned about fading. The system reliability has been increased by increasing the reliability of equipment or the wiring line. But it is still necessary to provide a stand by system or protection switching system to attain high reliability for wired communication systems.

In high reliability communication systems there occurs other problems, one of which is to assure the reliability of the stand by system or protection switching system itself, even if the high reliability of the total system can not be attained. One approach has been to provide a parallel system for a signal. For example, at a transmitting terminal the signal is branched to form three identical signals and transmitted through three parallel lines. At the receiving terminal, the three received signals are compared with each other and if a difference between them is found, then a majority law is adopted. Namely, if two of the three signals are equal to each other, then the third is rejected as being in error.

Such a system is reliable but expensive, so it is used only in limited situations where very high reliability is required. On the other hand, the reliability of equipment has been improved to a great extent and it has become practical to provide a single stand by system for several transmission lines, though there remains the problem of the reliability of the stand by system. Moreover, a modern multi-channel transmission system, such as a light communication system, is expensive and it has become too expensive to use the stand by system only for the transmission of auxiliary signals such as service or maintenance signals between the stations.

Another problem of protection switching systems is reducing the time for switching the signal from a working line to a stand by line when trouble occurs, because the transmission is interrupted during this switching time. A "hitless" system in which even an instantaneous breakdown of the transmission line is not allowed, is desirable for modern data transmission lines.

Figure 1:
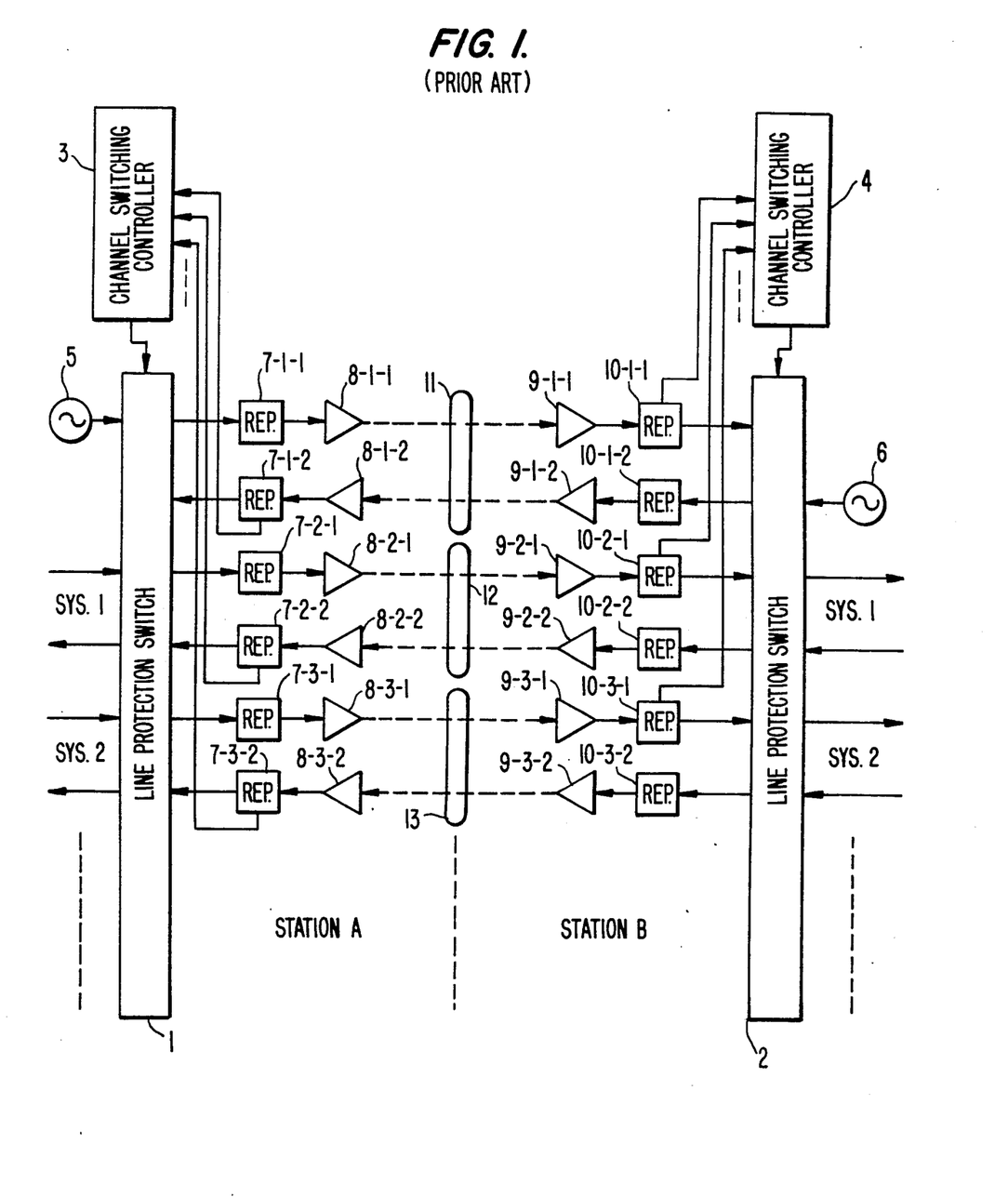
FIG. 1 is a block diagram showing a prior art protection switching system for a carrier transmission line.

Before disclosing the present invention, a prior art protection switching system for a carrier transmission line will be briefly described. FIG. 1 is a block diagram of an exemplary prior art digital multiplex signal transmission line system comprising a protection switching system. Multiplexed telephone, television (TV) or data signals, SYS-1, SYS-2, . . . , are transmitted between a terminal station A and a terminal station B (they are called hereinafter STATION A and STATION B, respectively) via the transmission lines 11, 12, 13, . . . . The transmission line may be a cable, optical fiber cable or any other type, and contains signal lines in both directions, i.e., up (from STATION B to STATION A) and down (from STATION A to STATION B) signal lines. In FIG. 1, the signal of SYS-1 is transmitted through a transmission line 12, and the signal of SYS-2 is transmitted through the line 13. The switching of these signals are done in line protection (LP) switches 1 and 2 controlled by channel switching controllers 3 and 4 in stations A and B, respectively.

The transmission line 11 is a service line or stand by line, through (or over) which is usually transmitted a service signal between the stations, such as a telephone order wire signal for the maintenance service men between the stations, SC signal (supervisory and control signal) and SV signal (supervisory or surveillance signal, etc., that is used for service and order between the stations). Such signals are called auxiliary signals. Sometimes the system is provided with a redundant SC signal line (not shown) between the switch controllers 3 and 4 of each station.

In the stand by line 11 are inserted in the downward direction (from STATION A to STATION B) a terminal repeater (REP) 7-1-1, repeaters 8-1-1, 9-1-1 and a terminal repeater 10-1-1. In the upward direction (from STATION B to STATION A) are inserted a terminal repeater 10-1-2, repeaters, 9-1-2, 8-1-2 and a terminal repeater 7-1-2. They all work together for relaying the signals. The configuration of equipment is similar for the working lines 12, 13 and so on. Usually, a terminal repeater includes a multiplexer, demultiplexer, etc. and sometimes it includes an electro-optical converter for light transmission systems. Though not shown in FIG. 1, the transmission line may include additional repeaters, amplifiers or repeater stations.

The reference numerals 5 and 6 designate dummy signal generators which send dummy signals over respective stand by lines. The dummy signal is detected by the terminal repeater of the opposite station in order to monitor the transmission characteristics of the stand by line. Such dummy signals are especially effective for optical fiber cable systems to maintain the repeaters at their predetermined condition, since the time constant of AGC (automatic gain control) for optical communication equipment is usually long compared to that of electronic communication systems.

Each receiving terminal repeaters 10-1-1, 10-2-1, 10-3-1, 7-1-2, 7-2-2, 7-3-2, etc. is provided with detectors to watch the input signal level, coding error, bit error or trouble in equipment, so that if trouble or an abnormal situation is detected, the terminal repeater (REP) sends an alarm to the respective channel switching controller 3 or 4. Then the channel is switched by the LP switch 1 or 2 under the control of the channel switching controller 3 or 4. For example if the REP 10-2-1 in the STATION B detects an abnormal condition, that means a problem occurred in some part of the down signal line in transmission line 12 (that is, in the transmission system from REP 7-2-1 through line 12 to REP 10-2-1) and an alarm is sent to the channel switching control (CSC) 4. The CSC 4 sends a command to the CSC 3 in the STATION A to switch the working line 12 to the stand by line 11. This command is sent through the stand by line 11 or redundant SC signal line (not shown). In some recent systems the command is sent via upward working lines 11, 13 and so on using their idle channel or idle bits.

Receiving the command, the CSC 3 in the STATION A controls the LP switch 1 to switch the signals SYS-1 from line 12 to line 11, and when the switching is completed, the CSC 3 sends a signal indicating that the switching is completed to the CSC 4, via the redundant SC signal line (not shown) or idle channel or idle bits of downward working lines (lines 11, 13 and so on). When the signal is received by the CSC 4, it controls the LP switch 2 to switch the main signal SYS-1 from the line 12 to the stand by line 11.

Thus the system switching is finished. Then the dummy signal generators 5 and 6 send dummy signals through transmission line 12 by the command of CSC 3 and 4, and the rehabilitation work on line 12 is monitored by checking the received dummy signal at the REP 10-2-1 or 7-2-2.

Generally, a single stand by line is enough for several working lines. But, depending on the reliability required of the system, the number of stand by lines may be increased. Also, usually, when the failed line (line 12 in this example) is repaired, the system is again switched to the former line 12, and the line 11 is reserved as a stand by line. Such a system is called a fixed protection line system. On the contrary, a system called a floating protection line system keeps the restored line (line 12 in this example) as a new stand by line, and uses the former stand by line (line 11) as a working line. Usually, the fixed protection line system is used.

Figure 2:
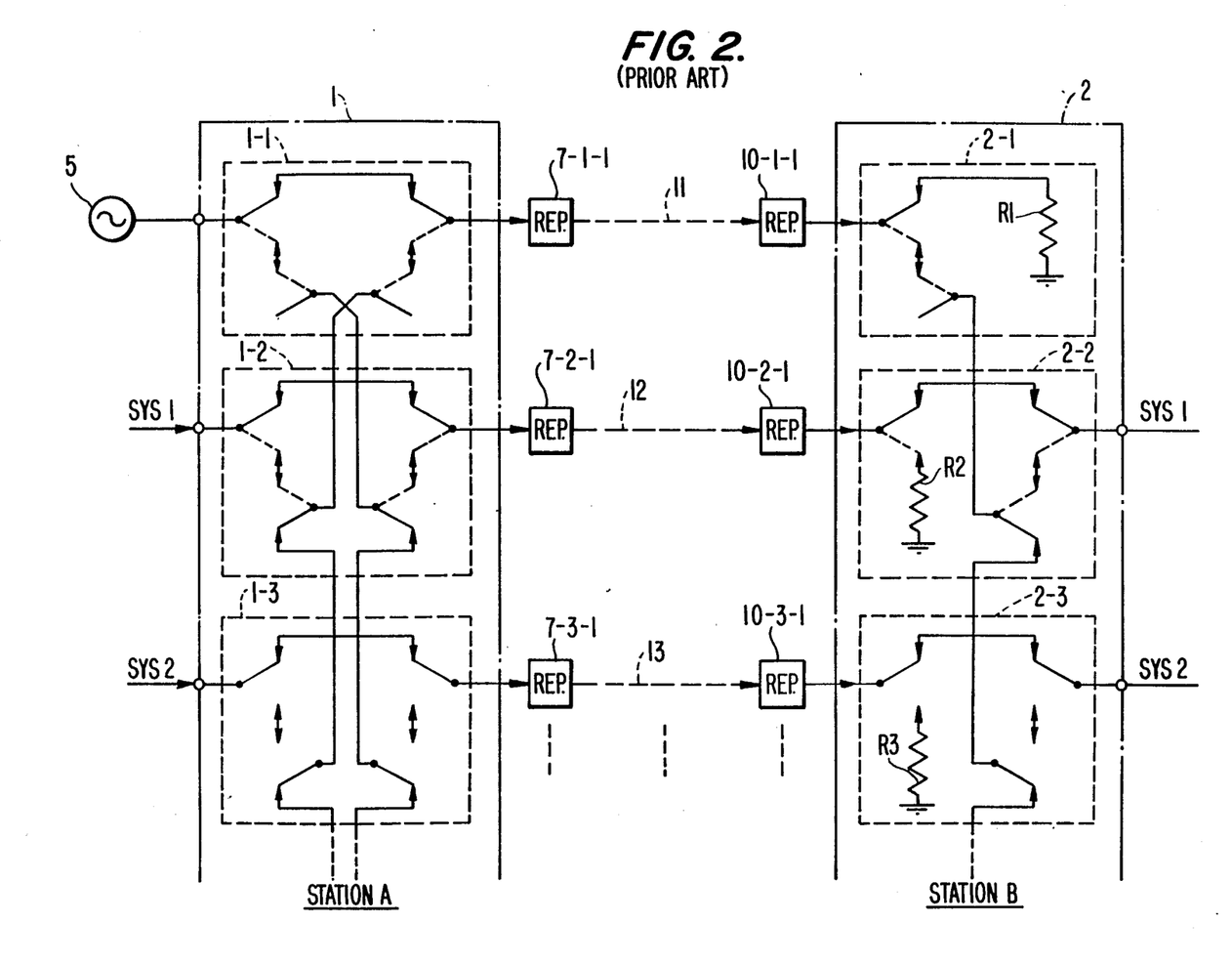
FIG. 2 is a block diagram showing a main part of a prior art switching system.
Figure 3A:
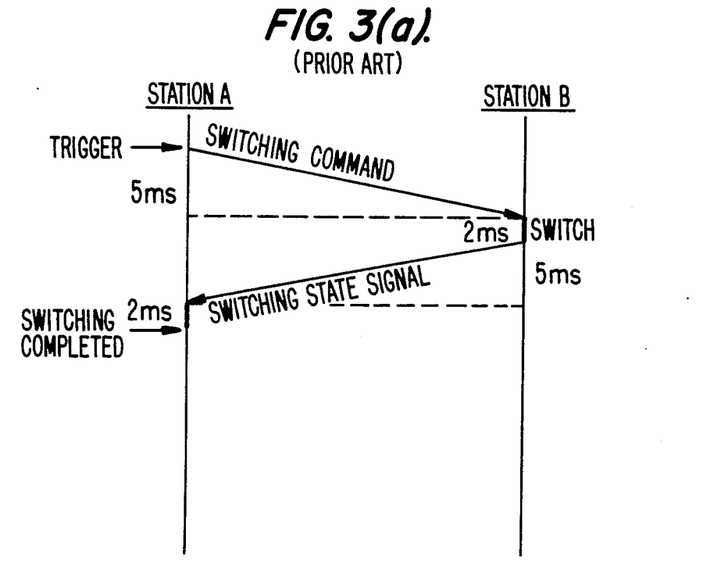
FIG. 3(a) is a time chart showing the normal sequence of the protection line switching in the prior art system illustrated in FIG. 1.
Figure 3B:
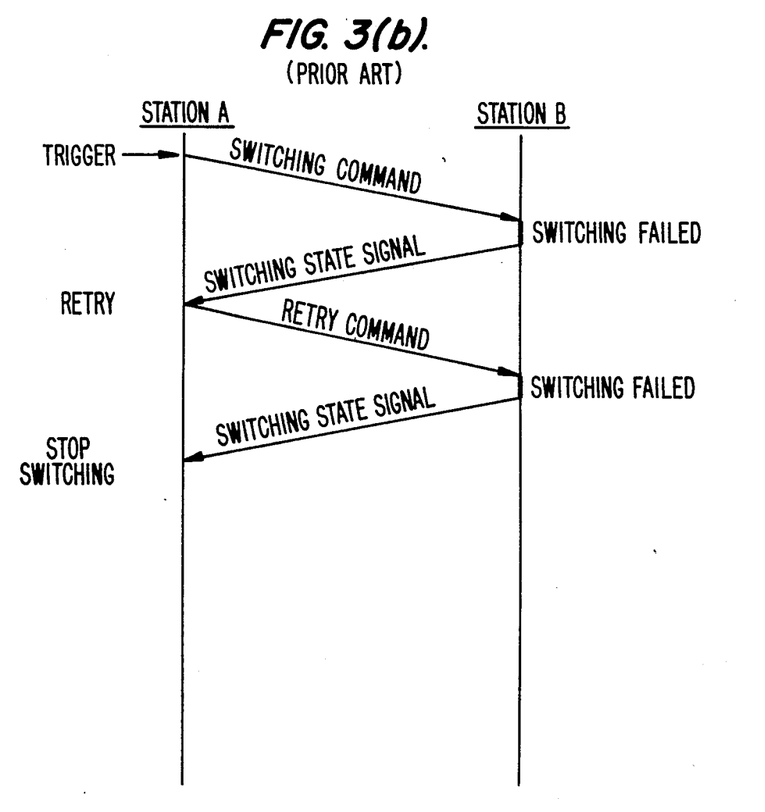
FIG. 3(b) is a time chart showing the sequence of the protection line switching in the prior art system, illustrated in FIG. 1, when the switching has failed by accident.

As mentioned before, one of the problems of the prior art is the reliability of the stand by system; if the stand by system has failed, the system cannot work. Other problems will be described with reference to FIGS. 2 and 3. In FIGS. 2 and 3, like reference numerals and characters designate like or similar parts of FIG. 1.

FIG. 2 is a block diagram showing a main part of a prior art switching system. The figure shows only the downward lines. In practice, a similar circuit for the upward lines is used forming pairs with the downward lines. The following explanation will be given assuming a single stand by and fixed protection line system. The switching elements 1-1, 1-2, 1-3, - - - and 2-1, 2-2, 2-3, - - - are composed of a mercury relay switch, for example. Resistors $R_1$, $R_2$, $R_3$, - - - have the same resistance as the line impedance (usually 75 ohms) to terminate the transmission line. In the example of FIG. 2, the dummy signal generated by the dummy signal generator 5 is transmitted from the STATION A to STATION B via the line 11 (the stand by line), and terminated by the resistor $R_1$.

If trouble occurs in the working line 12, the signal SYS-1 is switched to the stand by line 11 in the manner described before. In this case the contact points of the switching elements 1-1, 1-2, 2-1 and 2-2 shift from the position shown by solid lines to the position shown by broken lines, in response to commands from the CSC 3 and 4. Then, as can be seen in FIG. 2, the signal SYS-1 is switched from transmission line 12 to 11, and the dummy signal is switched from the stand by line 11 to the failed line 12 and terminated by the resistor $R_2$. By analyzing the dummy signal received by REP 10-2-1, the fault point is detected and repaired.

When the trouble is removed, the working line is shifted to the line 12 and the line 11 is kept again as a stand by line. In such a system, the terminating resistors $R_1$, $R_2$ and so on are part of the switching elements 2-1, 2-2 and so on. Therefore the signal arrived at the STATION B via the stand by line, e.g., line 11, cannot be output from the switching elements. So it has not been possible to use the stand by line 11 as a signal transmission line.

Recently, the transmission line system has become increasingly expensive as it becomes highly multiplexed and complicated. In such a system, the stand by system is almost kept in an idle station, so long as trouble does not occur and a working line is not switched to the stand by line. There arose a desire, therefore, to utilize the stand by line as a working line. Moreover, as can be seen in FIG. 2, the switching elements for the STATION A (1-1, 1-2 etc.) must be a different type from that of STATION B (2-1, 2-2 etc.). It is not desirable to provide and stock different types of parts from the viewpoint of economy.

Another problem of the prior art is the switching time. FIGS. 3(a) and 3(b) are time charts showing the sequence of the protection line switching in a prior art system. FIG. 3(a) shows a normal sequence of the switching and FIG. 3(b) shows the sequence of the system when the switching has failed by accident. In FIGS. 3(a) and 3(b), time flow is shown from top to bottom, and the thick vertical lines shows switching which is performed in STATION A and STATION B.

Referring to FIGS. 1 and 3, if the terminal repeater REP 7-2-2 in STATION A detects an abnormal condition and sends an alarm signal to the CSC 3, the alarm signal triggers the switching of the line 12 to the line 11. As mentioned before, the switching command is sent from the STATION A to the STATION B and it takes about 5 ms for the command to reach to the STATION B. Then, the CSC 4 commands the LP switch 2 to switch the line 12 to the line 11. It takes about 2 ms for this switching. When the switching in STATION B is completed, the CSC 4 sends a status signal to the STATION A that the switching is completed. It again takes about 5 ms for the status signal to reach to the STATION A. After receiving this signal, the CSC 3 commands the LP switch 1 to switch the signal SYS-1 from the line 12 to line 11 to complete system switching. It again takes about 2 ms for this switching in the STATION A. Thus, it takes altogether approximately 14 ms for the system to switch from a working line (line 12 in this example) to the stand by line 11.

Although rare, sometimes STATION B fails to switch the line. FIG. 3(b) shows the sequence of such a case. The triggering of the switching is similar to that of FIG. 3(a). However, in the STATION B, when the CSC 4 is notified by the LP switch 2 that the switching has failed due to some failure of equipment or parts, the CSC 4 sends a signal indicating that the switching has failed to the STATION A, in the status signal indicating the switching situation. Then, the CSC 3 sends a command to retry the switching to the STATION B. By this command, the STATION B again tries the switching of lines 12 and 11. If the switching is successful, the following step is the same as that of FIG. 3(a). Thus, it will take about 26 ms total for the switching. But if the switching fails again, the CSC 4 sends a signal that the switching has failed and when this signal is received, the CSC 3 stops the switching operation and alarms the operator that the situation is a matter of importance. As has been described, it is important to reduce the switching time to reduce the loss of time in the system.

SUMMARY OF THE INVENTION

The object of the present invention, therefore, is to increase the reliability of a communication system by increasing the reliability of the protection switching system.

Another object of the present invention is to economize the transmission system by utilizing a stand by system as a transmission line.

A further object of the present invention is to reduce the switching time of a communication system from a working line to a stand by line.

In order to increase the reliability of the stand by system, the SC signal (supervisory and control signal) of the system is transmitted not only through the stand by line, but also through the working lines in parallel. Thus, even if the stand by line has failed, the SC signal is transmitted, so long as a single working line is alive; therefore, the system control is never lost.

According to the present invention, the stand by system is not kept in an idle state, but it is used for transmission of lower priority signals. At the same time, the switching elements for the channel switching is unified. So, it is economical both from the viewpoints of manufacturing and stocking of the elements.

In order to reduce the switching time, the system according to the present invention switches the line at the station which detected the failure, without waiting for the switching of the opposite station, at the same time it commands the opposite station to switch the line. Therefore, the switching time is reduced to about a half of that of the prior art systems.

The details and the advantages of the present invention will be disclosed in the following description of preferred embodiments of the invention together with the accompanied drawings. Throughout the drawings like reference numerals or characters designate the same or similar parts.

DESCRIPTION OF THE PREFERRED EMBODIMENTS

As mentioned before, it is important to attain high reliability of a service or control signal system in a communication system. Otherwise, the system will lose control and high reliability of the total system cannot be attained. In other words, the system reliability cannot be higher than the reliability of the service and control line system.

In order to attain high reliability of the service and control line, the present invention transmits an auxiliary signal or service signals, such as the telephone order wire signals, SC signals (supervisory and control signals) and SV signals (supervisory or surveillance signals) both through the stand by line and working lines in parallel. Therefore, so long as at least one line is working normally, the system never loses control. By sending the service signals through a working line, each working line may lose some of its channels or bits, but as will be described later, the loss of the channels or bits is very small, and may not actually occur at all. Moreover, the present invention uses the stand by line for transmitting a signal of lower priority, so that the total channels or bits transmitted through the system is much larger than in the prior art system, in which the stand by line was kept idle except for transmitting the service signals.

Another advantage of the present invention is to reduce the switching time of the system from a working line to a stand by line when trouble occurs. These features and advantages will be disclosed with reference to some preferred embodiments.

Figure 4:
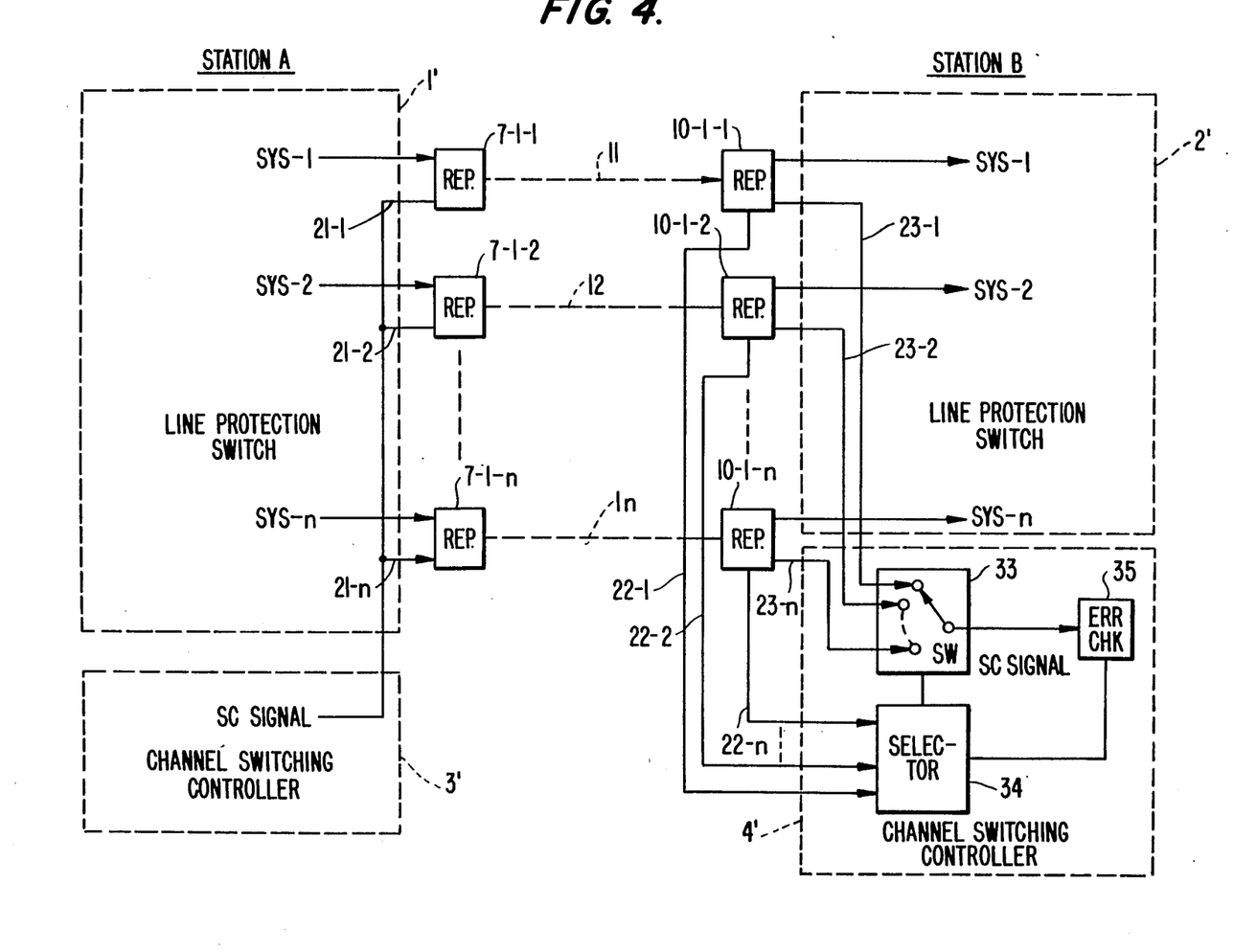
FIG. 4 is a block diagram showing a redundant SC signal system according to the present invention, illustrating a one-way system as an embodiment.

A first embodiment sends the service signals through both the stand by line and the working lines. The block diagram of the total system is similar to that of FIG. 1, but the channel switching controller (CSC) is improved. FIG. 4 shows the CSC of the present invention illustrating the structure of the portion relevant to the invention. FIG. 4 shows only the portion concerning the down signal line, but similar equipment is used for the up signal line, thus forming a pair of systems with the illustrated equipment.

FIG. 4 is a part of a system equivalent to that of FIG. 1. The system links the STATION A and STATION B with transmission lines 11, 12, - - -, 1n, i.e., altogether n transmission lines. Each line includes repeaters, terminal repeaters (REP), cables or optical fiber cables and so on, similar to those illustrated in FIG. 1. In this example, the transmission line 1n is used as a stand by line. Each station A and B is provided with an LP switch, 1' and 2', respectively, and each transmission line is terminated respectively at REPs 7-1-1, 7-1-2, - - - of STATION A and REPs 10-1-1, 10-1-2, - - - of STATION B. This configuration is similar to that of FIG. 1. If necessary, the stand by line 1n may be used as a working line to transmit signals, though the system reliability decreases because there is no stand by line.

Unlike the system of FIG. 1, the transmission lines 11, 12, - - -, 1n in FIG. 4 transmit the service (SC) signals. As shown in FIG. 4, the service (SC) signals are fed in parallel to all transmission lines through the service signal lines 21-1, 21-2, - - -, 21-n in LP switch (line protection switch) 1'. The method used to insert the auxiliary or service signals into or separate the signals from the main signals of each line will be disclosed later. At the receiving station (STATION B in the example of FIG. 4) these auxiliary or service signals are separated and sent to the terminals of a selection switch SW in a selector 33, via the service signal lines 23-1, 23-2, - - -, 23-n. As mentioned with respect to FIG. 1, each REP of both stations is provided with detectors to watch the input signal level, coding error, bit error or trouble in equipment, and if trouble or an abnormal situation is detected, the REP sends an alarm to a selector controller 34 via the alarm signal lines 22-1, 22-2, - - - , 22-n. The selector 33 under the control of the selector controller 34 selects a contact of the selection switch SW where there is no alarm. Thus, the SC signal can be transmitted to STATION B so long as at least one transmission line is alive.

The system of FIG. 4 is provided with further means to increase the reliability of the service signal. As shown in FIG. 4, the SC signal is closely monitored by an error checker 35, which is operated automatically or manually, and though there is no alarm signal, the SC signals received by each REP are compared, and the selector 33 is controlled to connect the transmission line which provides the best signal. Therefore, STATION B always receives the service signal in the best condition possible by the transmission system.

The switching action of the embodiment illustrated in FIG. 4 from a working line to the stand by line when trouble or an abnormal situation occurs, is quite similar to that of the prior art system described with respect to FIG. 1.

Figure 5:
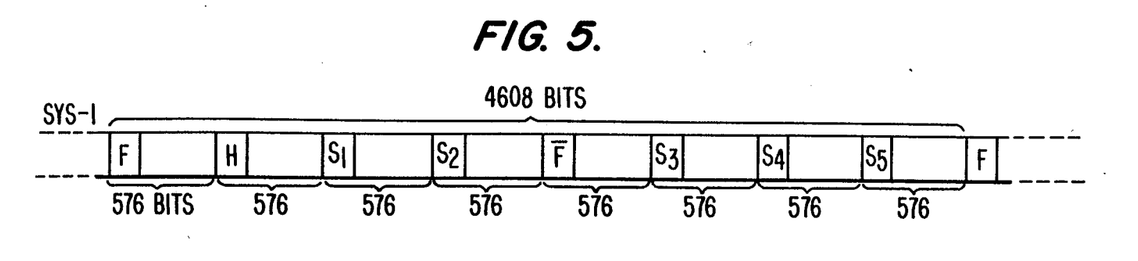
FIG. 5 is a chart illustrating a frame structure of a PCM signal.

Next, how the service signals (which will be denoted as SC signals hereinafter) are inserted into or separated from the main signals in each REP will be considered. Such drop/insertion of an SC signals is a well known and widely used technology in the art of communication. Since the present invention utilizes such known technology, the circuit and its process of drop/insertion will not be described herein. The details are disclosed in, for example, "405 Mb/s SINGLE-MODE FIBER TRANSMISSION SYSTEM", 1984 IEEE International Conference on Communications; and "DC-400M PROTECTION SWITCHING EQUIPMENT USING MICROPROCESSOR', FSTJ. Vol 16, No. 4, 1980 December FIG. 5 shows the frame structure of a PCM (pulse code modulation) signal using the bit train of a 405 Mbit PCM signal as an example. The coded input signal is arranged in a frame of 4,068 bits as shown in the figure, and is transmitted with a rate of 88,000 frames per second. Each frame is divided into eight sub-frames of 576 bits. At the head of each frame and sub-frame are provided, respectively, frame bits F or service bits S1, S2, - - - , as shown in FIG. 5. The number of frame and service bits depends on the system design, but usually 9 bits are allotted. The frame bits F are used to indicate the beginning of the frame, and sometimes inverse frame bit $\overline{F}$ (each bit of which is inverse to that of frame bits F) is inserted as shown in FIG. 5, to check errors in the frame bits F. The service bits are used to transmit signals between stations to consult each other, or remote checking of the conditions of repeaters or equipment of each station.

Consider as an example, a signal transmitted by the frame shown in FIG. 5. If the frame in FIG. 5 is transmitted at 88 Kbit/sec, it is equivalent to more than a channel of a telephone signal; so it is enough to allot a few bits per frame for the SC signals. Usually, one of the service bits, denoted H in FIG. 5, is available for transmission of the SC signal. Therefore, as mentioned before, no bits of the main signal are lost by transmitting the SC signal in parallel through the working lines. In a rare case in which no service bit has been allotted in the frame, the allotment of a few bits in each frame for the SC signal means a loss of less than one percent (for the case of FIG. 5, it is 9/4,608).

Figure 6:
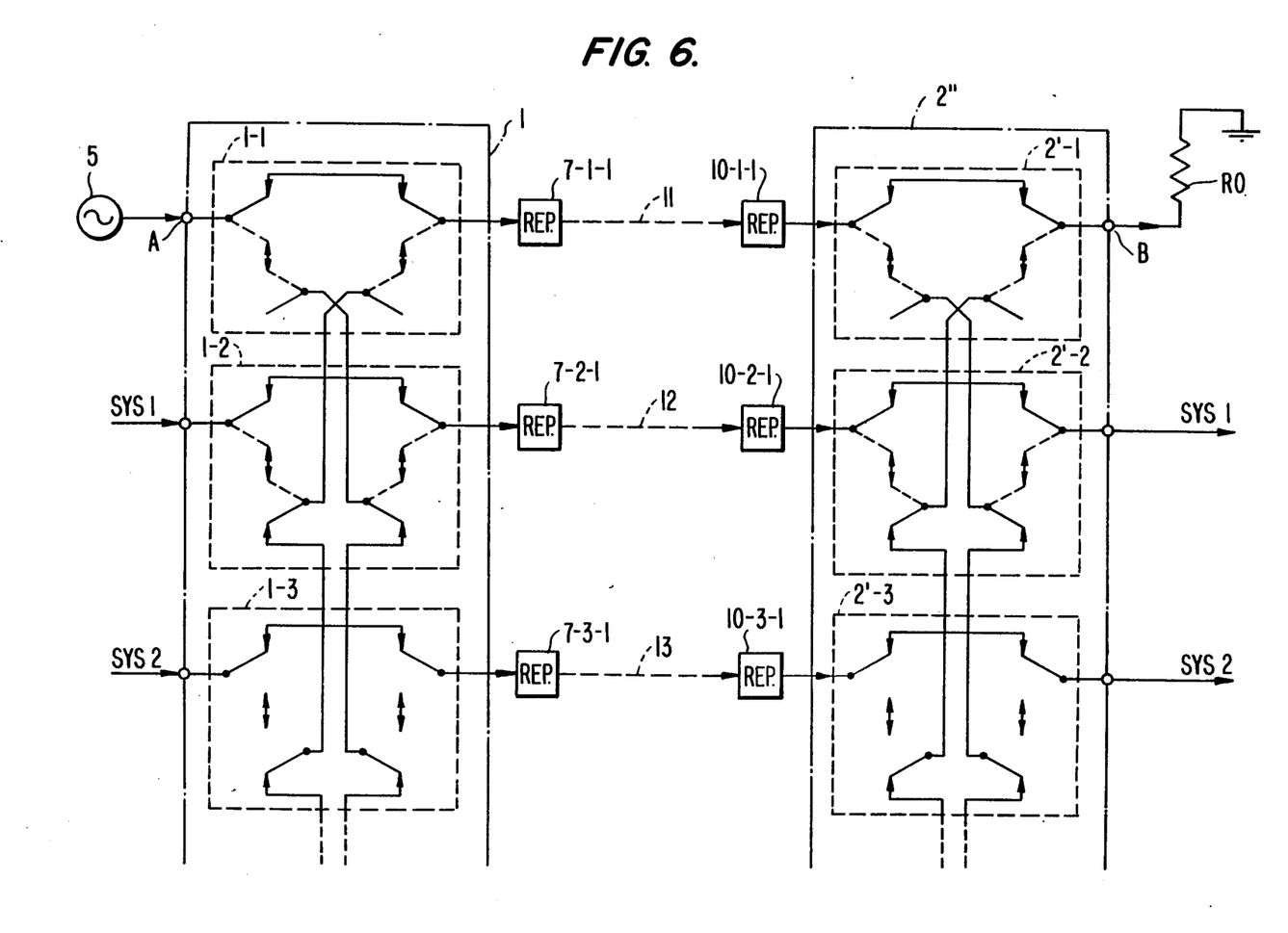
FIG. 6 is a block diagram showing a main part of a switching system according to the present invention.

In a second embodiment, the line switching equipment is able to output a signal from a terminal, in order to transmit not only the SC signal but also part of a main signal through a stand by line. FIG. 6 shows a main part of the switching equipment in an LP switch according to the present invention. FIG. 6 shows only the downward lines. Like the case of FIG. 2, a similar circuit for the upward lines is used to form a pair with the downward lines. The following description will assume a single stand by and a fixed protection line system.

In FIG 6, like or similar reference characters or numerals designate the same or corresponding parts of FIG. 2. Unlike the prior art switch shown in FIG. 2, the terminating resistors $R_1$, $R_2$, - - - are removed from the switching equipment and a termination resistor $R_0$ is connected to an output terminal B of the switching element 2'-1 of the stand by line 11. The numeral 2" designates switching equipment of the receiving side, which is constructed the same as ones used in the sending side switch 1. Therefore, the signal of the stand by line 11 is available at the output terminal B.

In FIG. 6, a dummy signal generated by the dummy signal generator 5 is transmitted through the stand by line 11 and terminated by the termination resistor $R_0$. If trouble occurs in the transmission line 12, for example, the contact points of the switching elements 1-1, 1-2, - - - , and 2'-1, 2'-2, - - - are shifted from the position of the solid lines to those of the broken lines, in a manner like that described before. So, in the STATION A the signal of SYS-1 is switched from the working line 12 to the stand by line 11, and the dummy signal is switched from the stand by line 11 to the failed working line 12. At the same time in the STATION B, the signal received by the terminal repeater (REP) 10-1-1 is switched to the output of the SYS-1, and the dummy signal received by REP 10-2-1 is terminated by the termination resistor $R_0$. These switching operations are done under the control of the channel switching controller (not shown) in a manner similar to that described with respect to FIG. 1.

The failure point is detected by analyzing the dummy signal received at the STATION B, and the rehabilitation of the failed line 12 is performed while watching the dummy signal. When the failure is repaired, the system is switched again transmit the signal of SYS-1 through the line 12, and the line 11 is kept as a stand by line.

As mentioned before, the stand by line 11 may be used for transmitting a signal having a lower priority, such as a a time-signal, weather forecast, etc., which is transmitted at a fixed time. The priority of the signal is determined beforehand and at the transmission station the low priority signal is switched manually or automatically under the command of the channel switching controller 3 or 4 and transmitted through the stand by line. In the STATION A the low priority signal is fed to the input terminal A, and output from the output terminal B in the STATION B.

In such a manner, the stand by line can be used not only from the SC signals but also for some low priority signal transmission. So, the utilization rate of the system is increased. Moreover, since the switching elements for both upward and downward LP switches are identical, it is economical from the viewpoint of both manufacturing and stocking of the switching elements.

The second embodiment has been described with respect to a fixed protection line system, but is will be easy for one of ordinary skill in the art to apply this system to a floating protection line system.

A third embodiment decreases the switching time for switching a main signal from a working line to a stand by line when trouble occurs in the working line. To do so, the system switches the main signal at first in a local station where the problem is originally detected, without waiting for the completion of switching in the remote station. At the same time, a switching command is sent to the remote station, so the switching time is reduced to about half of the prior art switching time.

Figure 7:
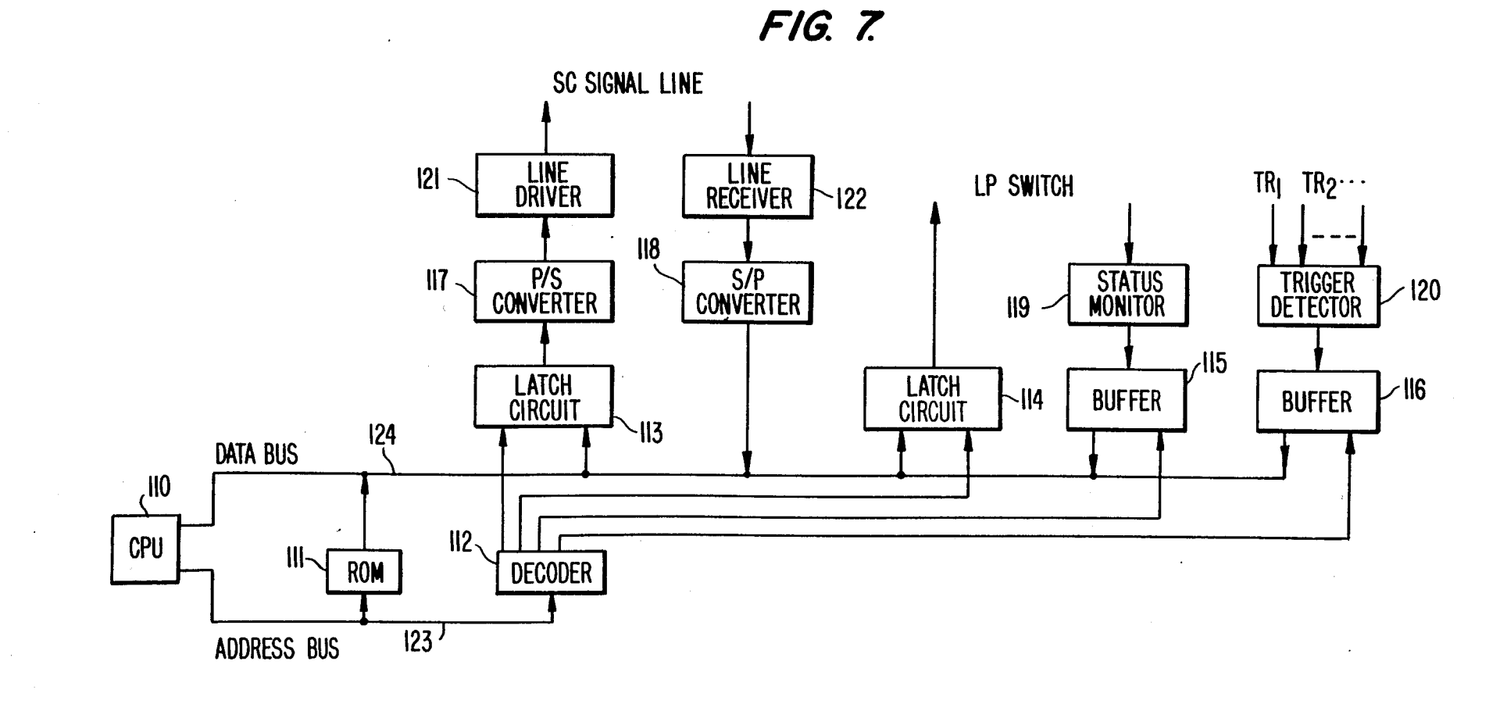
FIG. 7 is a block diagram of a channel switching controller according to the present invention.

FIG. 7 is a block diagram of a channel switching controller according to the present invention, which corresponds to the controller designated by reference numerals 3 or 4 in FIG. 1. The block diagram of FIG. 7 shows the equipment for STATION A. In an operating system, STATION B is provided with similar equipment and they work as a pair. The system configuration is similar to that of FIG. 1, except for the channel switching controllers. A sequence of switching will be described mainly with respect to the operations in the STATION A by referring to FIGS. 1 and 7. Like the foregoing examples, the main signals SYS-1, SYS-2, - - - are transmitted through the transmission lines 12, 13, - - - respectively, and the line 11 is a stand by line.

In FIG. 7, reference numeral 110 designates a CPU (central processing unit) which controls the process of the channel switching controller, 111 is a ROM (read only memory) which stores the programs for switching and 112 is a decoder which assigns the addresses corresponding the signal sent from the CPU 110 via an address bus 123. The CPU 110 sends a command to the decoder 112 to assign the address of each of the buffer memories 115 and 116 to read out the data stored in them with a proper timing, so that the data are successively output to the data bus 124. When the system is operating normally, the data in the buffer memories 114 and 115 indicate that the state of operation is normal, and the CPU 110 recognizes it.

A trigger detector 120 collects a trigger signal $TR_i$ from each terminal repeater (REP). Suppose that the terminal repeater (REP) 7-2-2 in the STATION A has detected trouble and sent a trigger signal, the trigger detector 120 of the channel switching controller 3 discriminates which $TR_i$ is sending the trigger signal and stores the data in the buffer circuit 116. The CPU 110 reads this signal from the buffer 116 via the data bus 124. Recognizing that a problem has occurred, the CPU 110 reads a switching program stored in the ROM 111. The switching program comprises a local program for the local station (STATION A) and a remote program for the opposite or remote station (STATION B). The former program is latched in a latch circuit 114 and the latter program is latched in a latch circuit 113.

The latched program in the latch circuit 114 is sent to the LP switch 1 of the STATION A and commands it to switch the signal SYS-1 from the transmission line 12 to a stand by line 11. When the switching is completed, the status monitor 119 sends a signal that the transmission line is switched. By this signal the memory in the buffer circuit 115 is altered, and the CPU 110 recognizes it via the data bus 124.

Meanwhile, the switching program latched in the latch circuit 113 is converted to a serial signal by a P/S converter (parallel to serial converter) 117 and sent to the channel switching controller 4 of the opposite station (STATION B) by a line driver 121 via an SC signal line (which is the stand by line 11 in this example). In the opposite station (STATION B), the same equipment as shown in FIG. 7 is provided; therefore, the description hereinafter will refer to the equipment shown in FIG. 7, as though it is in STATION B. The switching command from the STATION A is received by a line receiver 122 and converted to a parallel signal by an S/P converter (serial to parallel converter) 118 and sent to the CPU 110 via the data bus 124.

CPU 110 of the STATION B reads a switching program stored in the ROM 111 and latches it in the latch circuit 114, and commadns the LP switch 4 of the STATION B to switch the SYS-1 from the line 12 to the stand by line 11. When the switching is completed, the CPU 110 recognizes it through the status monitor 119 and a buffer memory 115, and reads a status signal stored in the ROM 111 indicating that the switching is completed. It should be pointed out that at this instant the SYS-1 is switched from the failed transmission line 12 to the stand by line 11, and the transmission of the main signal is recovered. The following sequences are only to certify between STATIONS A and B that the switching is completed. The status signal is latched by the latch circuit 113, and sent to the STATION A by the line driver 121 via an SC signal line, after being converted to a serial signal by the P/S converter 117.

Though it is not shown in the figure, the SC signal line is kept always in good condition by utilizing the system described with respect to the first or second embodiments of the present invention. In the STATION A, the signal from the STATION B indicating that the switching is completed is received by the line receiver 122, and converted to a parallel signal by the S/P converter 118 and sent to the CPU 110 via the data bus 124. The sequence is completed by recognition of the status signal by CPU 110 in STATION A.

Reduction of the time for production line switching by the above sequence will be explained with reference to FIGS. 8(a) and 8(b), which show a time sequence of the switching. The time flow is shown from top to bottom in FIGS. 8(a) and 8(b), and vertical lines in the figure show the sequence which is performed in STATION A and STATION B.

Figure 8A:
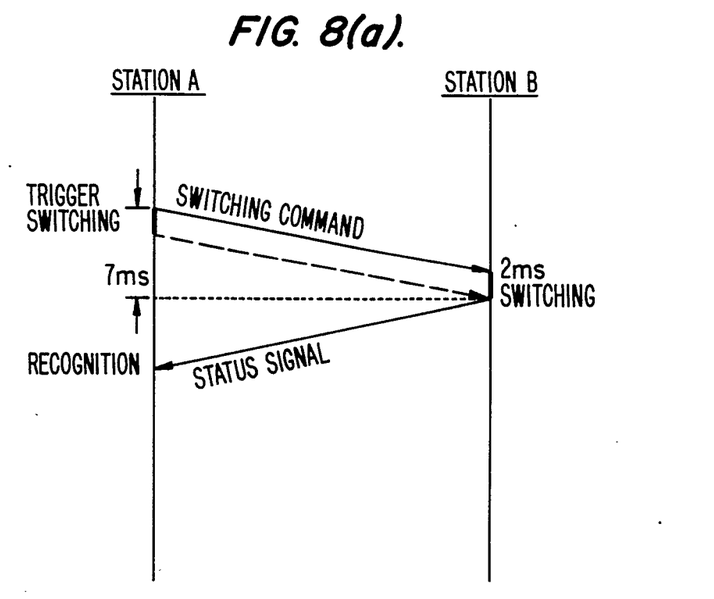
FIG. 8(a) is a time chart showing the normal sequence of the protection line switching by the present invention.

FIG. 8(a) shows a case wherein the switching is completed successfully; thus, corresponding to FIG. 3(a). Suppose that in the STATION A triggering of the switching has occurred, the CPU 110 of the STATION A thus commands the LP switch 1 in STATION A to switch the signal SYS-1 to the stand by line and at the same time the command is sent to the STATION B. It will take approximately 5 ms for the command signal to reach the STATION B and the switching in each station takes approximately 2 ms. As soon as the switching in the STATION A is completed, the main signal is sent to the STATION B via the stand by line (shown by a broken line). In the STATION B the switching is finished in approximately 2 ms, so the STATION B is ready to receive the main signal when it arrives; therefore, the total switching time is approximately 7 ms. The remainder of the sequence is only to certify, between each station, that the switching has been completely successfully. The STATION B sends a signal to the STATION A that the switching is completed. It takes another 5 ms for the STATION A to receive the status signal and recognize that the switching has been performed correctly. Comparing FIG. 8(a) to FIG. 3(a), the switching time is reduced effectively to about half that of the prior system.

Figure 8B:
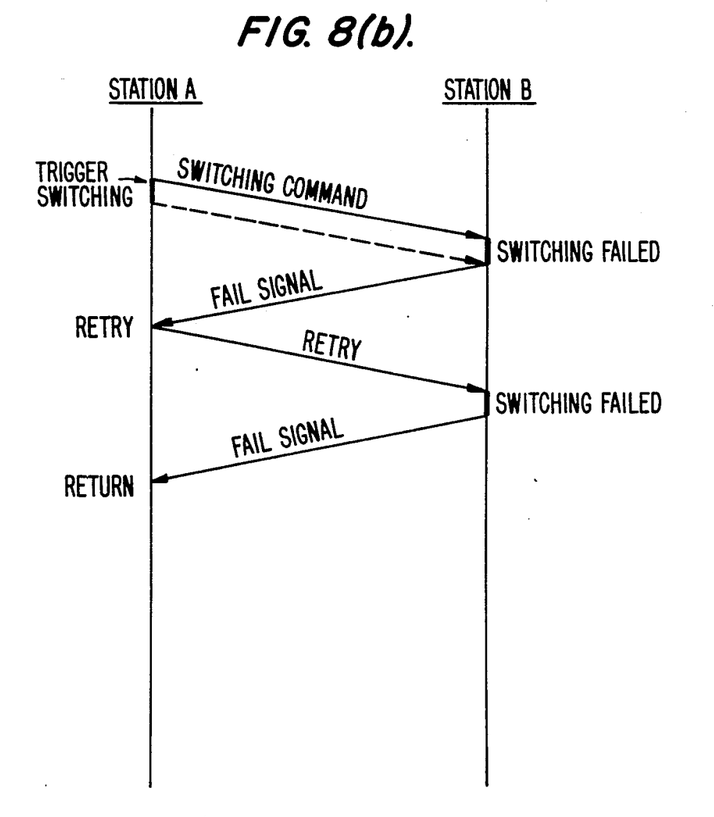
FIG. 8(b) is a time chart showing the sequence of the system according to the present invention, when the switching has failed by accident.

FIG. 8(b) shows a sequence of the very rare case wherein the switching has failed due to a failure of equipment or parts of the system. In the STATION A the switching is triggered, in the same manner described with respect to FIG. 8(a). The STATION A switches the LP switch 1 and at the same time the switching command is sent to the STATION B. Receiving this command, the CPU 110 of the STATION B commands the switching of the LP switch 2 or 2'. But if the switching has not been done correctly, due to the failure of equipment, the status monitor 119 detects it and sends a fail signal to the buffer circuit 115, and the CPU 110 recognizes that the switching was not done correctly. Then the CPU 110 selects a fail signal out of the ROM 111. This fail signal is sent to the STATION A via the latch circuit 113, the P/S converter 117, the line driver 121, and the SC signal line.

Meanwhile, the main signal is sent from the STATION A to the STATION B, but the STATION B cannot receive the signal. In the STATION A the fail signal is received by the line receiver 122 and sent to the CPU 110 via the S/P converter 118 and the data bus 124. The CPU 110 of the STATION A recognizes that the switching has not been completed in a correct manner, so the CPU 110 selects a retry command out of the ROM 111, and sends it to the STATION B through the latch circuit 113, the P/S converter 117, and the line driver 121 via the SC signal line. Receiving this signal, the CPU 110 of the STATION B selects a retry program out of the ROM 111, and commands the switching of the LP switch 2 again in a manner similar to that described above.

If the switching is completed successfully in the retry operation, the following sequences are the same as that of FIG. 8(a), but if the switching has failed again, the CPU 110 of the STATION B recognizes it, and sends a fail signal again to the CPU 110 of the STATION A in a manner similar to that described above. So, the CPU 110 in the STATION A recognizes that the switching has failed again. Then the CPU 110 selects a program from the ROM 111 to go back to the initial state and commands the LP switch 1 to go back to the initial state. The system goes back to the initial state and stops. At the same time, the CPU sends an alarm to the operator.

As has been described above, the present invention provides higher reliability for a protection switching system and reduces the switching time for the protection line. Moreover, it economizes the transmission system by utilizing the stand by system for transmission of main signals.

The above disclosure has been given emphasizing the process sequences which are of interest with respect to the present invention, but the equipment and parts used in the system are all conventional for transmission technology, so the details of the equipment and their performance are omitted for simplicity. In addition, there will occur modifications or applications to one skilled in the art, which are within the spirit and scope of the present invention. For example, it will be clear that the present invention can be applied not only to a cable transmission line or an optical fiber cable line, but it can also be applied to a radio transmission line.

We claim:

1. A protection switching system for a digital carrier transmission line transmitting pulse code modulation bit frames having an auxiliary bit area, comprising:
    terminal stations, each including a selector for receiving auxiliary signals and means for detecting trouble on the digital carrier transmission line;
    at least one main transmission line, operatively connected to said terminal stations, for transmitting main signals between said terminal stations;
    means for detecting trouble on said at least one main transmission line; and
    at least one stand by line, operatively connected to said terminal stations, for transmitting the main signal when said means detects trouble on said at least one main transmission line, the auxiliary signals between said terminal stations being transmitted in parallel using at least two lines among said at least one main transmission line and said at least one stand by line, utilizing the auxiliary bit area of the pulse code modulation bit frames, and the selector selecting the auxiliary signals received over one of said stand by line and said main transmission line which is operating normally.

2. A protection switching system according to claim 1, wherein the auxiliary signals between said terminal stations include a control signal.

3. A protection switching system according to claim 1, wherein the auxiliary signals between said terminal stations include a supervisory signal.

4. A protection switching system according to claim 1, wherein the auxiliary signals between said terminal stations include an order wire maintenance signal.

5. A protection switching system according to claim 1, wherein the auxiliary signals between said terminal stations are transmitted in parallel using said at least one main transmission line and said at least one stand by line.

6. A protection switching system according to claim 1, wherein each of said terminal stations are further comprises an error checker, operatively connected to said main transmission and stand by lines, for comparing the auxiliary signals and selecting a best signal.

7. A protection switching system for a digital carrier transmission line between terminal stations, comprising:
    main transmission lines, operatively connected to the terminal stations, for transmitting main signals between the terminal stations;
    detection means for detecting trouble in a failed transmission line among said main transmission lines;
    at least one stand by line, operatively connected to said terminal stations, for transmitting the main signal when said detection means detects that the failed transmission line is in trouble; and
    means for ordinarily transmitting a low priority signal among said main signals over said stand by line and for transmitting the low priority signal over the failed transmission line when said detection means detects trouble in the failed transmission line.

8. A protection switching system according to claim 1, further comprising means for transmitting a low priority signal among the main signals over said stand by line.

9. A protection switching system for a digital carrier transmission line, comprising:
    at least one main transmission line for transmitting a main signal;
    at least one stand by line for transmitting signals including low priority signals and the main signal when one of said at least one main transmission line is in trouble; and
    terminal stations for sending and receiving the main signal, each of said terminal stations comprising:
    means for detecting trouble on said at least one main transmission line;

a line protection switch, operatively connected to said main transmission and stand by lines, for switching said main transmission and stand by lines, said line protection switch having a terminal for outputting the signals received by said terminal stations over said stand by line; and a dummy signal generator, operatively connected to said line protection switch, for providing said stand by line with a dummy signal to be transmitted with the low priority signals.

10. A protection switching system according to claim 9, wherein each of said line protection switches comprises switching elements, operatively connected to said main transmission and stand by lines, which are identical for both the sending and receiving performed in said terminal stations.

11. A protection switching system according to claim 9, wherein each of said terminal stations further comprises a termination resistor operatively connected to the terminal which outputs the signals sent over said stand by line.

12. A protection switching system for a digital carier transmission line, comprising:

main transmission lines for transmitting a main signal;

at least one stand by line for transmitting the main signal when one of said main transmission lines is in trouble; and terminal stations, operatively connected to said main transmission and stand by lines, for detecting trouble in a failed one of said main transmission lines, a commanding station among said terminal stations switching the failed one of said main transmission lines to said stand by line and simultaneously commanding an opposite terminal station to perform a switching operation of the failed one of said main transmission lines and said stand by line, the opposite terminal station sending a status signal to the commanding station which is commanding the switching operation, the commanding station reversing the switching of the failed one of said main transmission lines and said stand by line, when the status signal is received with an indicaion that the opposite terminal station did not switch the failed one of said main transmission lines and said stand by line.

13. A protection switching system according to claim 12, wherein if the status signal indicates that the switching operation failed, the commanding terminal station commands the opposite one of said terminal stations to retry the switching operation, and if the switching operation fails twice consecutively, the commanding terminal station commanding the switching operation stops the switching operation, then reverses the switching of the failed one of said main transmission lines and said stand by line.

14. A terminal station operatively connected to a remote terminal station via at least two transmission lines, including a main and a stand by line, for transmitting and receiving main and auxiliary signals in a digital carrier transmission system, the auxiliary signals received by said terminal station including a first dummy signal, said terminal station comprising:

a dummy signal generator for generating a second dummy signal;

line protection switch means for switching the dummy and auxiliary signals onto the stand by line and the main signal onto the main line during normal operation and for switching the main signal onto the stand by line when an abnormal condition occurs on the main line, said line protection switch means having a terminal for outputting the first dummy signal received over the stand by line; and a termination resistor operatively connected to the terminal of said protection switch means for terminating the first dummy signal.

15. A terminal station, operatively connected to a remote terminal station via at least two transmission lines, for transmitting and receiving main and auxiliary signals in a digital carrier transmission system, one of the transmission lines serving as a stand by line, the remote terminal station generating a first dummy signal, said terminal station comprising:

a termination resistor for terminating the first dummy signal;

a dummy signal generator for generating a second dummy signal;

line protection switch means, operatively connected to said dummy signal generator, for switching the main signal onto a main one of the transmission lines and the auxiliary signal onto at least two of the transmission lines including the main one and the stand by line, comprising:

identical switching elements, operatively connected to said transmission lines, for switching the main and auxiliary signals being transmitted and received; and a terminal, operatively connected to said termination resistor for outputting the first dummay signal to said termination resistor; and channel switching control means for controlling the switching of said line protection switch means.

16. A terminal station according to claim 15, wherein said line protection switch means further comprises a selector, operatively connected to the transmission lines and said channel switching control means, for selecting one of the auxiliary signals to be supplied to said channel switching control means.

17. A terminal station according to claim 16, further comprising error check means for checking the auxiliary signal for errors and for controlling said selector.

18. A terminal station according to claim 15,
wherein the main signals include a low priority signal, and
wherein said terminal station further comprises means for transmitting the low priority signal together with the auxiliary signal over the stand by line.

19. A terminal station according to claim 15,
wherein the remote terminal station includes remote line protection switch means, and
wherein said channel switching control means comprises:
failure detection means for detecting a failure in a failed one of the transmission lines;
local line protection switch command means for controlling switching of said line protection switch means to switch the failed one of the transmission lines and the stand by line;
remote line protection switch command means for controlling switching of the remote line protection switch means to switch the failed one of the transmission lines and the stand by line;
status means for receiving local and remote status signals indicating whether the switching of the failed one of said transmission lines and the stand by line in said line protection switch means and the remote line protection switch means was successful; and processing means, operatively connected to said failure detection means, said local and remote line protection switch command means and said status means, for controlling the local and remote line protection switch command means to simultaneously command said line protection switch means and the remote line protection switch means to switch the failed one of the transmission lines and the stand by line and for reversing the switching of the failed one of the transmission lines and the stand by line when one of the local and remote status signals indicates that the switching was unsuccessful.

20. A terminal station according to claim 19, wherein said processing means controls the remote line protection switch command means to issue a retry command to the remote line protection switch means if the remote status signal indicates that the remoe line protection switch means failed to switch the failed one of the transmission line and the stand by line.

21. A terminal station according to claim 19,
wherein the main signals include a low priority signal, and
wherein said terminal station further comprises means for transmitting the low priority signal together with the auxiliary signal over the stand by line.

* * * * *

UNITED STATES PATENT AND TRADEMARK OFFICE
CERTIFICATE OF CORRECTION

PATENT NO. : 4,680,776
DATED : July 14, 1987
INVENTOR(S) : Ikeuchi et al.

It is certified that error appears in the above-identified patent and that said Letters Patent is hereby corrected as shown below:

[56] Add to U.S. PATENT DOCUMENTS --4,382,294  5/1983
     Beuscher et al. .................. 370/16--.

Col. 4, line 6, "station" should be --state--.

Col. 10, line 9, "commadns" should be --commands--;
        line 59, "pletely" should be --pleted--.

Col. 12, line 32, "are" should be deleted.

Col. 13, line 22, "carier" should be --carrier--;
        line 42, "indicaion" should be --indication--.

Col. 14, line 30, "dummay" should be --dummy--.

Col. 16, line 5, "remoe" should be --remote--.

Signed and Sealed this

Second Day of February, 1988

Attest:

DONALD J. QUIGG

Attesting Officer        Commissioner of Patents and Trademarks